United States Patent
Brewer

(10) Patent No.: US 11,695,704 B2
(45) Date of Patent: *Jul. 4, 2023

(54) REDUCED SIZED ENCODING OF PACKET LENGTH FIELD

(71) Applicant: Micron Technology, Inc., Boise, ID (US)

(72) Inventor: Tony Brewer, Plano, TX (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/685,073

(22) Filed: Mar. 2, 2022

(65) Prior Publication Data

US 2022/0191149 A1 Jun. 16, 2022

Related U.S. Application Data

(63) Continuation of application No. 17/007,376, filed on Aug. 31, 2020, now Pat. No. 11,296,995.

(51) Int. Cl.
*H04L 47/36* (2022.01)
*H04L 45/74* (2022.01)
*H04L 49/109* (2022.01)

(52) U.S. Cl.
CPC ............ *H04L 47/365* (2013.01); *H04L 45/74* (2013.01); *H04L 49/109* (2013.01)

(58) Field of Classification Search
CPC ..... H04L 45/74; H04L 45/741; H04L 45/745; H04L 69/22; H04L 49/109; H04L 49/15;

(Continued)

(56) References Cited

U.S. PATENT DOCUMENTS 6,404,737 B1 6/2002 Novick et al.
6,650,660 B1 11/2003 Koehler et al.
(Continued)

FOREIGN PATENT DOCUMENTS

WO WO-2017196143 A1 11/2017
WO WO-2019178813 A1 9/2019
(Continued)

OTHER PUBLICATIONS

"International Application Serial No. PCT/US2021/038657, International Search Report dated Oct. 5, 2021", 3 pgs.

(Continued)

*Primary Examiner* — Peter Chen
(74) *Attorney, Agent, or Firm* — Schwegman Lundberg & Woessner, P.A.

(57) ABSTRACT

Implementations of the present disclosure are directed to systems and methods for reducing the size of packet headers without reducing the range of packet lengths supported. A packet header includes a fixed-width length field. Using a linear encoding, the maximum packet size is a linear function of the fixed-width length field. Thus, to expand the range of sizes available, either the granularity of the field must be decreased (e.g., by changing the measure of the field from flits to double-flits) or the size of the field must be increased (e.g., by changing the size of the field from 4 bits to 5 bits). However, by using a non-linear encoding, the difference between the minimum and maximum size can be increased without decreasing the granularity within a first range of field values and without increasing the size of the length field.

20 Claims, 8 Drawing Sheets

(58) Field of Classification Search
CPC ... H04L 12/4641; H04L 47/36; H04L 47/365; G06F 11/0754; G06F 11/076; G06F 11/10; G06F 13/4022
See application file for complete search history.

(56) References Cited

U.S. PATENT DOCUMENTS

| | | |
|---|---|---|
| 7,477,637 B2 | 1/2009 | Koehler et al. |
| 7,613,209 B1 | 11/2009 | Nguyen et al. |
| 9,495,194 B1 | 11/2016 | Twitchell, Jr. et al. |
| 9,800,514 B1 | 10/2017 | Chen et al. |
| 9,946,462 B1 | 4/2018 | Li et al. |
| 10,216,537 B2 | 2/2019 | Twitchell, Jr. et al. |
| 10,419,990 B2 | 9/2019 | Uemura et al. |
| 11,075,647 B2 | 7/2021 | Rigo et al. |
| 11,296,995 B2 | 4/2022 | Brewer |
| 11,360,920 B2 | 6/2022 | Patrick et al. |
| 11,412,075 B2 | 8/2022 | Patrick et al. |
| 11,418,455 B2 | 8/2022 | Brewer |
| 11,539,623 B2 | 12/2022 | Brewer |
| 2005/0251612 A1 | 11/2005 | Creta et al. |
| 2007/0110053 A1 | 5/2007 | Soni et al. |
| 2008/0232364 A1 | 9/2008 | Beverly |
| 2008/0310427 A1 | 12/2008 | West |
| 2009/0261996 A1 | 10/2009 | Itoh |
| 2010/0153658 A1 | 6/2010 | Duncan et al. |
| 2011/0072177 A1 | 3/2011 | Glasco et al. |
| 2011/0078222 A1 | 3/2011 | Wegener |
| 2012/0159037 A1 | 6/2012 | Kwon et al. |
| 2013/0028261 A1 | 1/2013 | Lee |
| 2013/0051385 A1 | 2/2013 | Jayasimha et al. |
| 2013/0103783 A1 | 4/2013 | Mannava et al. |
| 2013/0142066 A1 | 6/2013 | Yamaguchi et al. |
| 2014/0010364 A1 | 1/2014 | Shibutani et al. |
| 2014/0365632 A1 | 12/2014 | Ishii et al. |
| 2014/0369355 A1 | 12/2014 | Hori |
| 2015/0010005 A1 | 1/2015 | Yoshida et al. |
| 2015/0052283 A1 | 2/2015 | Ishii et al. |
| 2015/0109024 A1 | 4/2015 | Abdelfattah et al. |
| 2015/0242261 A1 | 8/2015 | Yamaguchi et al. |
| 2016/0255048 A1 | 9/2016 | Ganesh et al. |
| 2017/0064544 A1 | 3/2017 | Youn et al. |
| 2017/0255582 A1 | 9/2017 | Harriman et al. |
| 2017/0310473 A1 | 10/2017 | Takiguchi et al. |
| 2017/0322841 A1 | 11/2017 | Morris et al. |
| 2018/0011759 A1 | 1/2018 | Willey et al. |
| 2018/0097722 A1 | 4/2018 | Callard |
| 2018/0307597 A1 | 10/2018 | Oh et al. |
| 2019/0171604 A1 | 6/2019 | Brewer |
| 2019/0243700 A1 | 8/2019 | Brewer |
| 2019/0324928 A1 | 10/2019 | Brewer |
| 2019/0332555 A1 | 10/2019 | Mcvay |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2020/0151137 A1 | 5/2020 | Izenberg et al. |
| 2020/0162191 A1 | 5/2020 | Yu et al. |
| 2020/0274552 A1 | 8/2020 | Rigo et al. |
| 2020/0380121 A1 | 12/2020 | Pasricha et al. |
| 2021/0142448 A1 | 5/2021 | Yao et al. |
| 2021/0297354 A1 | 9/2021 | Zemach et al. |
| 2022/0066969 A1 | 3/2022 | Patrick et al. |
| 2022/0070096 A1 | 3/2022 | Brewer |
| 2022/0070105 A1 | 3/2022 | Brewer |
| 2022/0070106 A1 | 3/2022 | Brewer |
| 2022/0070284 A1 | 3/2022 | Patrick et al. |
| 2022/0269633 A1 | 8/2022 | Patrick et al. |
| 2022/0360540 A1 | 11/2022 | Brewer |
| 2022/0360649 A1 | 11/2022 | Patrick et al. |

FOREIGN PATENT DOCUMENTS

| | | |
|---|---|---|
| WO | WO-2022046260 A1 | 3/2022 |
| WO | WO-2022046261 A1 | 3/2022 |
| WO | WO-2022046262 A1 | 3/2022 |
| WO | WO-2022046263 A1 | 3/2022 |
| WO | WO-2022046264 A1 | 3/2022 |

OTHER PUBLICATIONS

"International Application Serial No. PCT/US2021/038657, Written Opinion dated Oct. 5, 2021", 4 pgs.

"International Application Serial No. PCT/US2021/038669, International Search Report dated Oct. 5, 2021", 4 pgs.

"International Application Serial No. PCT/US2021/038669, Written Opinion dated Oct. 5, 2021", 5 pgs.

"International Application Serial No. PCT/US2021/038683, International Search Report dated Oct. 5, 2021", 3 pgs.

"International Application Serial No. PCT/US2021/038683, Written Opinion dated Oct. 5, 2021", 6 pgs.

"International Application Serial No. PCT/US2021/038689, International Search Report dated Oct. 14, 2021", 3 pgs.

"International Application Serial No. PCT/US2021/038689, Written Opinion dated Oct. 14, 2021", 5 pgs.

"International Application Serial No. PCT/US2021/038698, International Search Report dated Oct. 1, 2021", 3 pgs.

"International Application Serial No. PCT/US2021/038698, Written Opinion dated Oct. 1, 2021", 5 pgs.

"WikiChip Fuse", (Jan. 4, 2020), 9 pgs.

"International Application Serial No. PCT US2021 038657, International Preliminary Report on Patentability dated Mar. 9, 2023", 6 pages.

"International Application Serial No. PCT US2021 038669, International Preliminary Report on Patentability dated Mar. 9, 2023", 7 pages.

"International Application Serial No. PCT US2021 038683, International Preliminary Report on Patentability dated Mar. 9, 2023", 8 pages.

"International Application Serial No. PCT US2021 038689, International Preliminary Report on Patentability dated Mar. 9, 2023", 7 pages.

"International Application Serial No. PCT US2021 038698, International Preliminary Report on Patentability dated Mar. 9, 2023", 7 pages.

US 11,695,704 B2

REDUCED SIZED ENCODING OF PACKET LENGTH FIELD

PRIORITY APPLICATION

This application is a continuation of U.S. application Ser. No. 17/007,376, filed Aug. 31, 2020, which is incorporated herein by reference in its entirety.

STATEMENT REGARDING GOVERNMENT SUPPORT

This invention was made with U.S. Government support under Agreement No. HR001111890003, awarded by DARPA. The U.S. Government has certain rights in the invention.

TECHNICAL FIELD

Embodiments of the disclosure relate generally to network protocols and more specifically to networking using a reduced sized encoding of a packet length field.

BACKGROUND

A packet header includes a packet length field. The packet length field is interpreted as an integer that indicates the size of the packet in bytes or words.

Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property blocks) on one substrate (e.g., single die), such as a system-on-a-chip (SoC), or discretely packaged devices integrated on a board. In general, chiplets provide better performance (e.g., lower power consumption, reduced latency, etc.) than discretely packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets. Chiplets also support the tight integration of intellectual property blocks that can otherwise be difficult, such as those using different feature sizes. Thus, for example, devices designed during a previous fabrication generation with larger feature sizes, or those devices in which the feature size is optimized for the power, speed, or heat generation—as can happen with sensors—can be integrated with devices having different feature sizes more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Implementations of the present disclosure are directed to systems and methods for reducing the size of packet headers without reducing the range of packet lengths supported. A packet header includes a fixed-width length field (e.g., a 4-bit field, a 5-bit field, or a 6-bit field). Using a linear encoding, the maximum packet size is a linear function of the fixed-width length field. Thus, to expand the range of sizes available, either the granularity of the field must be decreased (e.g., by changing the measure of the field from flits to double-flits) or the size of the field must be increased (e.g., by changing the size of the field from 4 bits to 5 bits). However, by using a non-linear encoding, the difference between the minimum and maximum size can be increased without decreasing the granularity within a first range of field values and without increasing the size of the length field.

A source device transmitting data packets on a bus determines the length of each data packet (e.g., measured in flits) and uses a non-linear encoding to store the length of the data packet in the header of the data packet before transmission. The encoding may not allow for the exact size of the data packet. The source device may select the next higher size value and append additional flits to the data packet to ensure that the size value is correct.

Among the benefits of implementations of the present disclosure is that, compared with prior art systems that use a larger length field, network bandwidth is saved, reducing transmission time. Processing cycles expended in transferring, receiving, and processing data packets are reduced. Additionally, power consumed in performing the processing is reduced. Performance of the system comprising the communicating devices is also improved as a result of the reduced networking overhead. Other benefits will be evident to those of skill in the relevant art having the benefit of this disclosure.

Figure 1A:
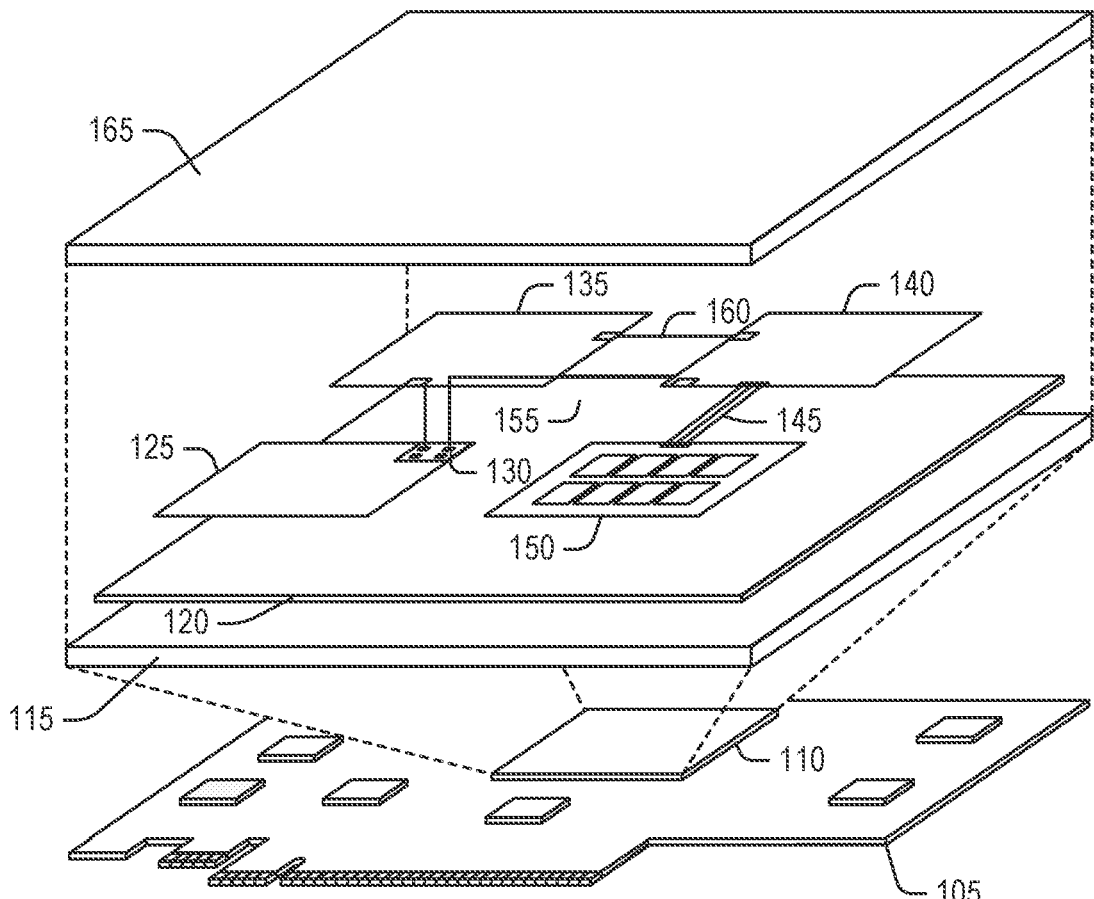
FIGS. 1A and 1B illustrate an example of a chiplet system, according to an embodiment.
Figure 1B:
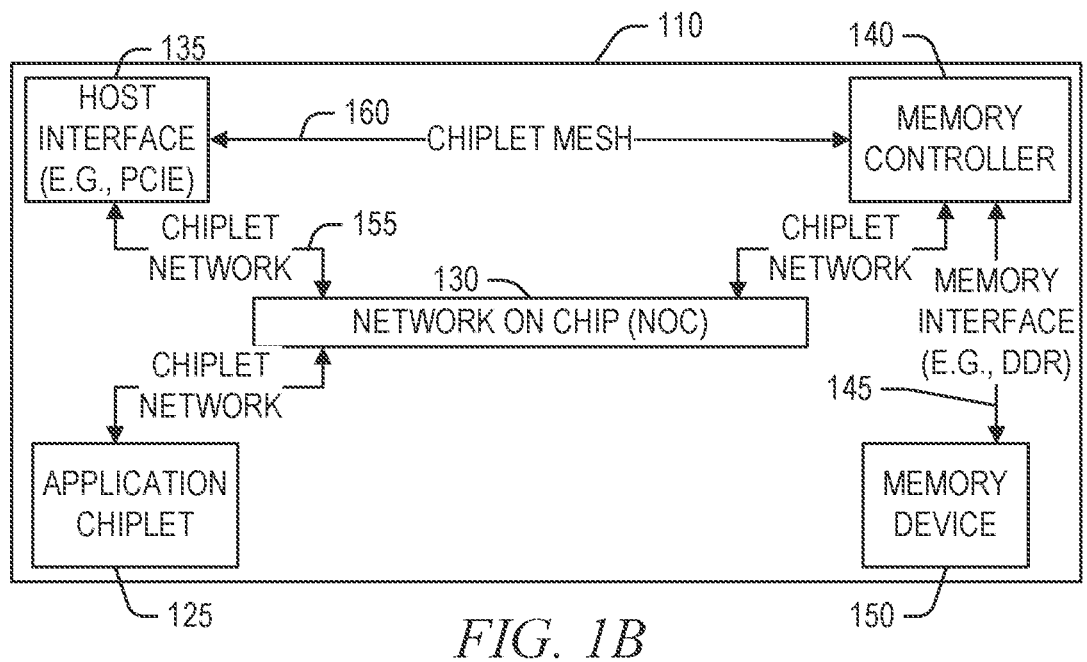

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets: an application chiplet 125, a host interface chiplet 135, a memory controller chiplet 140, and a memory device chiplet 150. Other systems may include many additional chiplets to provide additional functionalities, as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments, NOC 130 may be included on the application chiplet 125. In an example, NOC 130 may be defined in response to selected support chiplets (e.g., chiplets 135, 140, and 150), thus enabling a designer to select an appropriate number of chiplet network connections or switches for the NOC 130. In an example, the NOC 130 can be located on a separate chiplet or even within the interposer 120. In examples as discussed herein, the NOC 130 implements a CPI network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, and so forth. Within a single chip, these options are generally selected to meet design goals, such as power consumption, speed, and so forth. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections or drivers to increase the voltage, or otherwise facilitate transmitting the signals over longer distances. An example of one such physical layer can include the Advanced Interface Bus (AIB), which, in various examples, can be implemented in the interposer 120. AIB transmits and receives data using source-synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit (TX) and receive (RX) signals. The channel can be configured to have a symmetrical number of TX and RX input/outputs (I/Os), or have a non-symmetrical number of transmitters and receivers (e.g., either all transmitters or all receivers). The chiplet providing the primary clock is the primary chiplet; the other chiplet is the secondary chiplet. In such scenarios, a primary may have independence from other chiplets, and it may have supervisory authority over one or more secondary chiplets. AIB I/O cells support three clocking modes: asynchronous (i.e., non-clocked), SDR, and DDR. Other physical layers may support any or all of these clocking modes, or additional clocking modes. In various examples, the non-clocked mode is used for clocks and some control signals. The SDR mode can use dedicated SDR only I/O cells or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary (AUX) channel. The AUX channel contains signals used for AIB initialization. All AIB channels (other than the AUX channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

Also illustrated is a chiplet mesh network 160 that uses a direct, chiplet-to-chiplet technique without the need for the NOC 130. The chiplet mesh network 160 can be implemented in CPI or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system) can be through a desired interface (for example, a PCIE interface). Such an external interface may be implemented, in an example, through a host interface chiplet 135, which in the depicted example provides a PCIE interface external to chiplet system 110. Such dedicated interfaces 145 are generally employed when a convention or standard in the industry has converged on such an interface. The illustrated example of a DDR interface 145 connecting the memory controller chiplet 140 to a dynamic random access memory (DRAM) memory device chiplet 150 is just such an industry convention.

Of the variety of possible support chiplets, the memory controller chiplet 140 is likely present in the chiplet system 110 due to the near omnipresent use of storage for computer processing as well as being sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device chiplet 150, such as garbage collection in negative-and (NAND) flash or storage class memories and temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh, may be controlled by a host processor or a memory controller at some times, and at other times be controlled by the DRAM memory device or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, with the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet mesh network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIG. 1 illustrates an example of a memory controller chiplet that comprises a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), and graphics double data rate type 6 SDRAM (GDDR6 SDRAM), among others. Examples of non-volatile memory devices include, but are not limited to, NAND-type flash memory, storage class memory (e.g., phase-change memory or memristor based technologies), and ferroelectric RAM (FeRAM), among others. The illustrated example includes the memory device as the memory device chiplet 150; however, the memory device can reside elsewhere, such as in a different package on the board 105. For many applications, multiple memory device chiplets may be provided. In an example, these memory device chiplets may each implement one or multiple storage technologies. In an example, a memory chiplet may include multiple stacked memory die of different technologies (for example, one or more SRAM devices stacked or otherwise in communication with one or more DRAM devices). Memory controller chiplet 140 may also serve to coordinate operations between multiple memory chiplets in chiplet system 110 (for example, to utilize one or more memory chiplets in one or more levels of cache storage and to use one or more additional memory chiplets as main memory). Chiplet system 110 may also include multiple memory controller chiplets 140, as may be used to provide memory control functionality for separate processors, sensors, networks, and so forth. A chiplet architecture, such as chiplet system 110, offers advantages in allowing adaptation to different memory storage technologies and different memory interfaces, through updated chiplet configurations, without requiring redesign of the remainder of the system structure.

Figure 2:
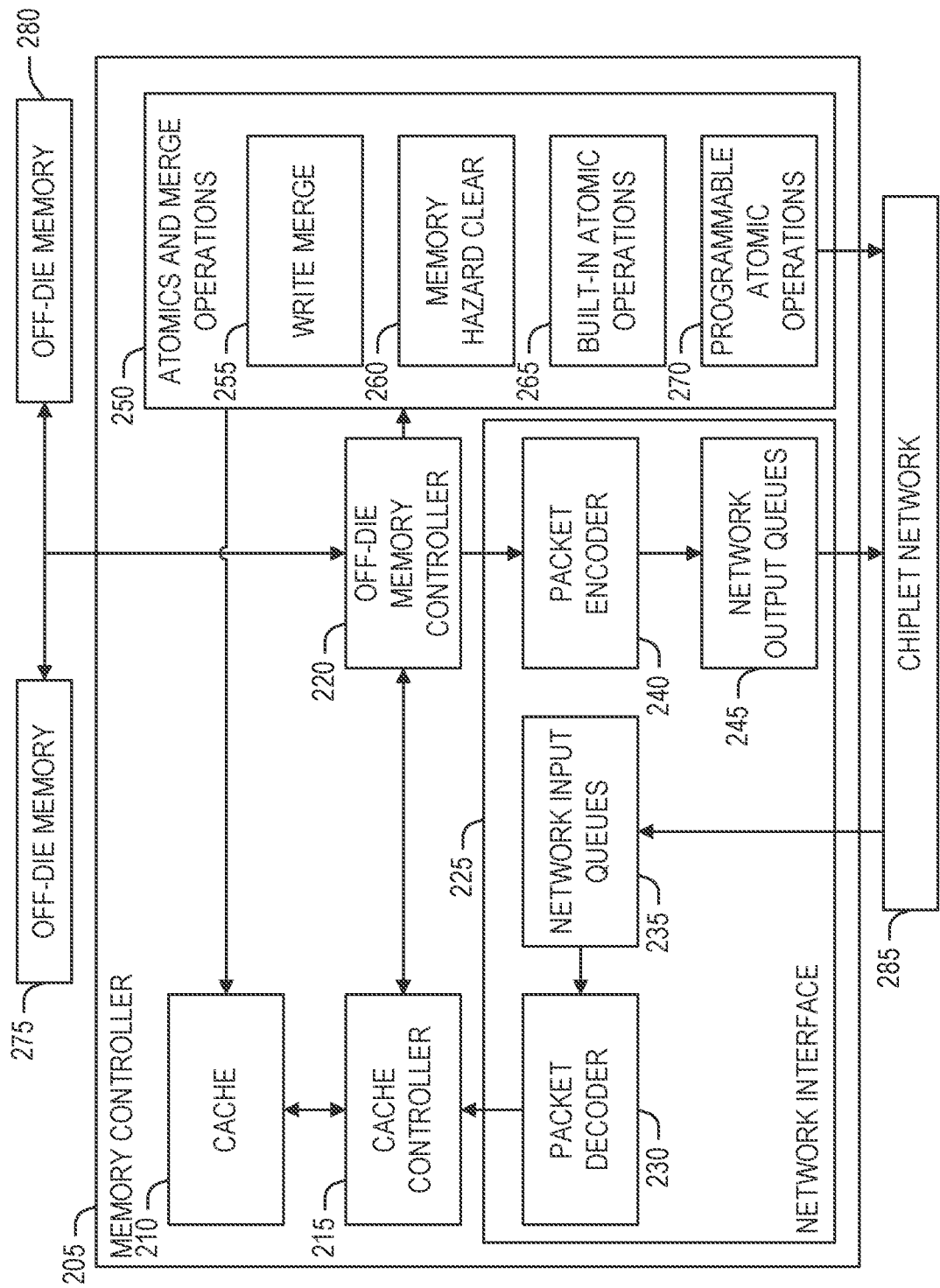
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 175), a network communication interface 225 (e.g., to interface with a chiplet network 180 and communicate with other chiplets), and a set of atomic and merge operations units 250. Members of this set can include, for example, a write merge unit 255, a hazard clear unit 260, built-in atomic unit 265, or a PAU 270. The various components are illustrated logically and not as they necessarily would be implemented. For example, the built-in atomic unit 265 likely comprises different devices along a path to the off-die memory. For example, the built-in atomic unit could be in an interface device/buffer on a memory chiplet, as discussed above. In contrast, the PAU 270 are likely implemented in a separate processor on the memory controller chiplet 205 (but in various examples may be implemented in other locations, for example on a memory chiplet).

The off-die memory controller 220 is directly coupled to an off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge operations units 250 and for input to the cache controller 215 (e.g., a memory side cache controller).

In the example configuration, cache controller 215 is directly coupled to the cache 210, and may be coupled to the network communication interface 225 for input (such as incoming read or write requests) and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgment that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge operations units 250, or both. As noted above, one or more levels of cache may also be implemented in off-die memories 275 or 280, and in some such examples may be accessed directly by cache controller 215. Data read by the off-die memory controller 220 can be cached in the cache 210 by the cache controller 215 for later use.

The atomic and merge operations units 250 are coupled to receive (as input) the output of the off-die memory controller 220, and to provide output to the cache 210, the network communication interface 225, or directly to the chiplet network 285. The memory hazard clear (reset) unit 260, write merge unit 255, and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry and various state machines with other combinational logic circuitry or other logic circuitry, and can also include one or more registers, buffers, or memories to store addresses, executable instructions, operand and other data, or can be implemented as a processor.

The write merge unit 255 receives read data and request data and merges the request data and read data to create a single unit having the read data and the source address to be used in the response or return data packet. The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic operations unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and, optionally, up to 32-bytes of data. The atomic operation performs the read-modify-write to a cache memory line of the cache 210, filling the cache memory if necessary. The atomic operator response can be a simple completion response or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics, such as fetch-and-increment or compare-and-swap, which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the data packet encoder 240 to encode outgoing data packets for transmission on the chiplet network 285, the built-in atomic operation unit 265 provides the resulting data to the write merge unit 255, which will also write the resulting data to the cache 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation to ensure that no other operation (read, write, or atomic) is performed on that memory line, which hazard bit is then cleared upon completion of the atomic operation. Additional direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic operations is to provide multiple custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations, and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will release a pending read or write request involving the designated (or reserved) cache line, providing the pending read or write request to an inbound request multiplexer for selection and processing.

Figure 3:
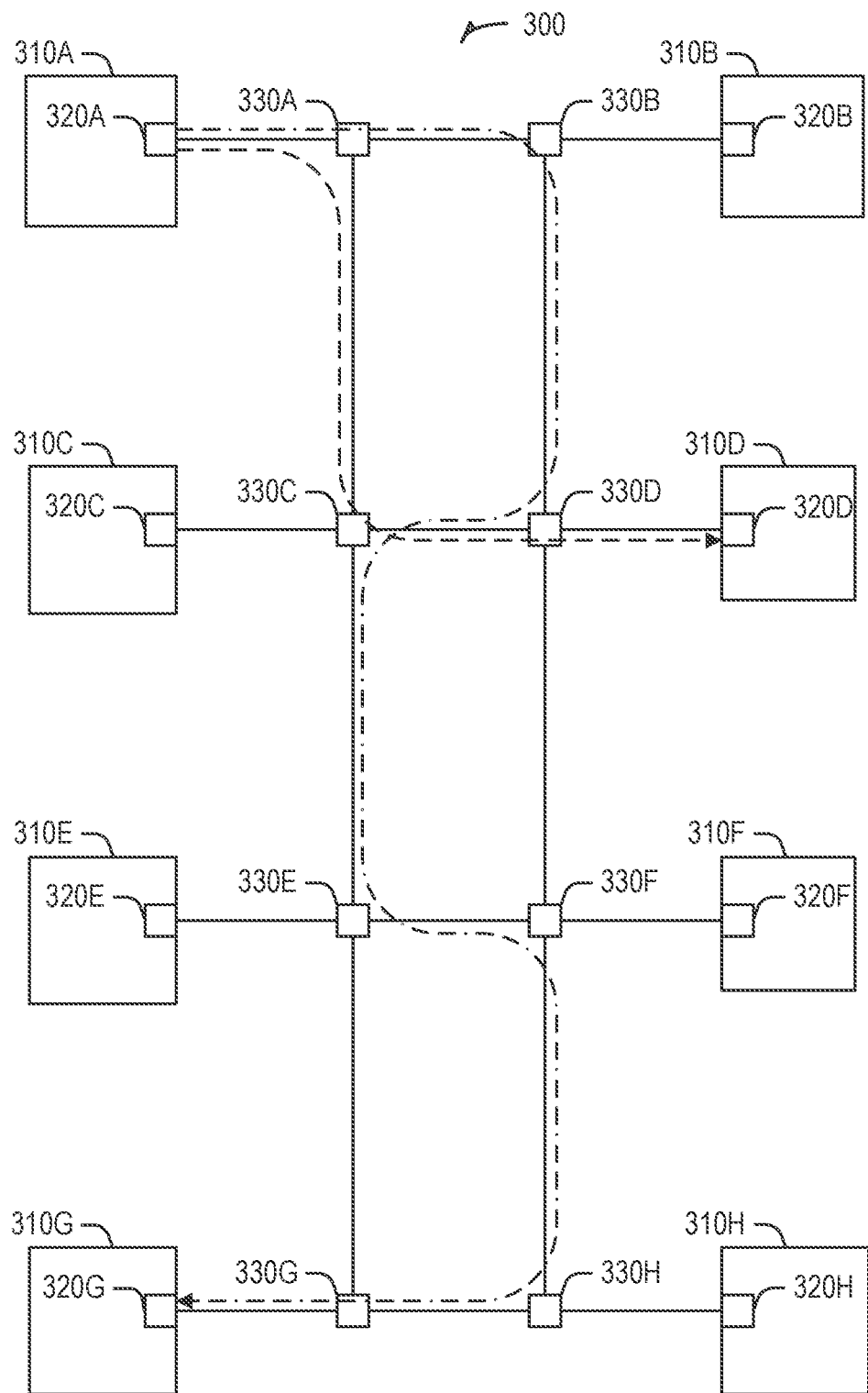
FIG. 3 illustrates an example of routing between chiplets using a chiplet protocol interface (CPI) network, according to an embodiment.

FIG. 3 illustrates an example of routing between chiplets in a chiplet layout 300 using a CPI network, according to an embodiment. The chiplet layout 300 includes chiplets 310A, 310B, 310C, 310D, 310E, 310F, 310G, and 310H. The chiplets 310A-310H are interconnected by a network comprising nodes 330A, 330B, 330C, 330D, 330E, 330F, 330G, and 330H. Each of the chiplets 310A-310H includes a hardware transceiver, labeled 320A-320H.

Packets using a packet protocol of the network (e.g., the CPI protocol) can be transferred between the chiplets 310 using a physical layer (e.g., AIB). The physical layer transmits and receives data. For example, AIB transmits and receives data using source synchronous data transfers with a forwarded clock. Packets are transferred across the AIB at SDR or DDR with respect to the transmitted clock. Various channel widths are supported by the AIB. AIB channel widths are in multiples of 20 bits when operated in SDR mode (20, 40, 60, . . . ), and 40 bits for DDR mode (40, 80, 120, . . . ). The AIB channel width includes both TX and RX signals. The channel may be configured to have a symmetrical number of TX and RX I/Os or have a non-symmetrical number of transmitters and receivers (e.g., either all transmitters or all receivers). The channel may act as an AIB primary or secondary depending on which chiplet provides the primary clock.

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O Cells. AIB I/O cells (implemented, in some example embodiments, by the hardware transceivers 320) may be input only, output only, or bidirectional. An AIB channel is composed of a set of AIB I/O cells and the number of cells is dependent on the configuration of the AIB channel. The receive signals on one chiplet are connected to the transmit signals on the paired chiplet. In some example embodiments, each column comprises an AUX channel and data channels numbered 0 to N.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AIB I/O cells. An AIB channel for streaming mode may configure the I/O cells as all TX, all RX, or half TX and half RX, in some example embodiments.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H; forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e., non-clocked), SDR, and DDR. The non-clocked mode is used for clocks and some control signals. The SDR mode may use dedicated SDR only I/O cells or dual use SDR/DDR I/O cells.

CPI packet protocols (point-to-point and routable) may use an AIB channel in either SDR or DDR operation modes. In some example embodiments, the AIB channel is in increments of 80 I/O cells (i.e. 40 TX and 40 RX) for SDR mode and 40 I/O cells for DDR mode.

CPI streaming protocol may use an AIB channel in either SDR or DDR operation modes. In some example embodiments, for both modes (SDR and DDR), the AIB channel is in increments of 40 I/O cells.

Each AIB channel is assigned a unique interface identifier. The identifier is used during CPI reset and initialization to determine paired AIB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

Each network node 330 comprises a hardware transceiver configured to send and receive packets (e.g., using flits). The hardware transceiver may be coupled to a memory that stores instructions and one or more processors that execute the instructions to route packets through the chiplet layout 300. In some example embodiments, one or more of the network nodes 300 are chiplets. Thus, while the chiplets 310 are shown as sending packets as a source chiplet or receiving packets as a destination chiplet, the chiplets 310 may also receive packets addressed to other chiplets and route the packets to their ultimate destination.

Figure 4:
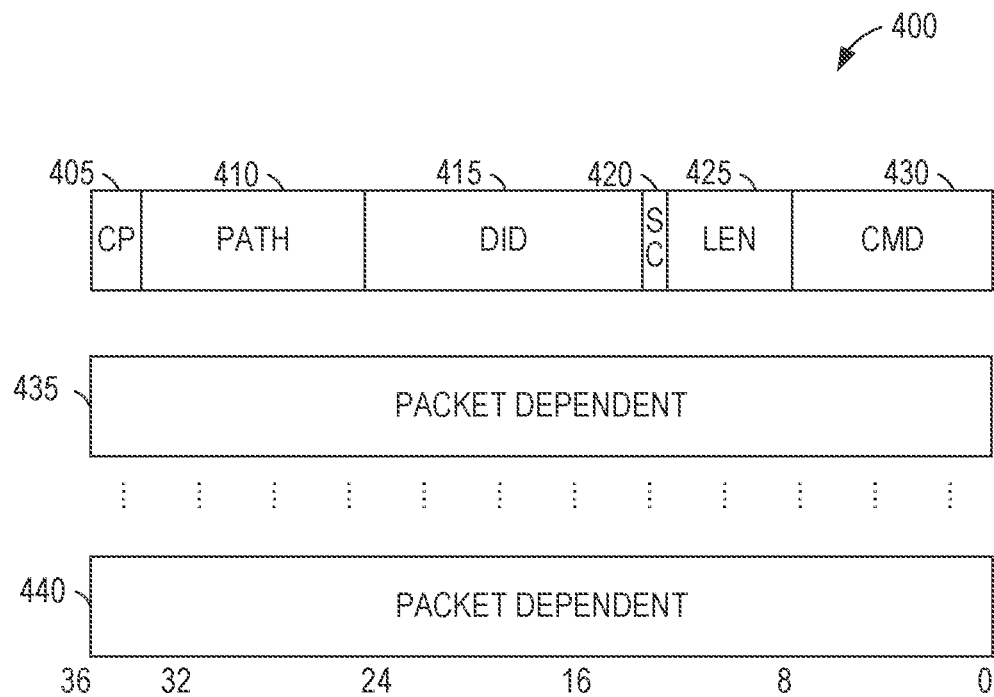
FIG. 4 is a block diagram of a data packet comprising multiple flits, in accordance with some embodiments of the present disclosure.

FIG. 4 is a block diagram of a data packet 400 comprising multiple flits, in accordance with some embodiments of the present disclosure. The data packet 400 is divided into flow control units (flits), each of which is composed of 36 bits. The first flit of the data packet 400 includes control path field 405, path field 410, destination identifier (DID) field 415, sequence continue (SC) field 420, length field 425, and command field 430. The second flit 435 and last flit 440 contain packet-dependent data. The data packet 400 includes a total number of flits indicated by the length field 425, and thus may not include one or both of the second flit 435 and the last flit 440 (e.g., if only one or two flits are included in the packet) or may include one or more additional flits between the second flit 435 and the last flit 440.

The control path field 405 is a two-bit field that indicates whether the CR/RSV field of later flits in the packet contain CR data, RSV data, or should be ignored, and whether the path field 410 should be used to control ordering of packets. In some example embodiments, a value of 0 or 1 in the control path field 405 indicates that the CR/RSV fields 455, 465 contain credit return data; a value of 2 or 3 in the control path field 405 indicates that the CR/RSV fields 455, 465 contain RSV data; a value of 0 indicates that the path field 410 is ignored; a value of 1 or 3 indicates that the path field 410 is used to determine the path for the data packet 400; and a value of 2 indicates that single path ordering is to be used. In some example embodiments a 1-bit field is used. Alternatively, the high bit of the control path field 405 may be considered to be a 1-bit field that controls whether the CR/RSV fields 455, 465 contain credit return data or RSV data.

The path field 410 is an eight-bit field. When the control path field 405 indicates that the path field 410 is used to determine the path for a data packet 400, all data packets having the same value for the path field 410 are guaranteed to take the same path through the network. As a result, the order of the data packets will be unchanged between the sender and the receiver. If the control path field 405 indicates that single path ordering is to be used, the path is determined for each packet as though the path field 410 were set to zero. Accordingly, all packets take the same path and the order will be unchanged, regardless of the actual value of the path field 410 of each data packet. If the control path field 405 indicates that the path field 410 is to be ignored, the data packets are routed without regard to the value of the path field 410 and the data packets may be received by the receiver in a different order than they were sent by the sender. However, this may avoid congestion in the network and allow for greater throughput in the device.

The DID field 415 stores a twelve-bit DID. The DID uniquely identifies a destination in the network (e.g., a destination chiplet). A sequence of data packets all having the SC field 420 set are guaranteed to be delivered in order. The length field 425 is a five-bit field that indicates the number of flits that comprise the data packet 400. Interpretation of the length field 425 may be non-linear. For example, values 0-22 may be interpreted as 0-22 flits in the data packet 400 and values 23-27 may be interpreted as 33-37 flits in the data packet 400 (i.e., 10 more than the indicated value). Thus, in this example, the minimum number of flits represented by the length field 425 is 0 and the maximum number of flits represented is 37. By contrast, a linear encoding of the length field 425 using one flit per increment of value would have a range of 0 to 31 flits.

Other values of the length field 425 may be vendor defined instead of protocol defined. Thus, in an implementation by a first vendor, the values 0-27 may be used as defined above and the values 28-31 interpreted as a first set of four vendor-defined numbers of flits (e.g., 24, 48, 64, and 96 flits) and, in an implementation by a second vendor, the values 0-27 are also used as defined above but the values 28-31 are interpreted as a different set of vendor-defined numbers of flits (e.g., 40, 42, 44, and 46 flits). The two sets of vendor-defined numbers of flits may have one or more common values or be completely different.

The command for the data packet 400 is stored in the command field 430, a seven-bit field. The command may be a write command, a read command, a predefined atomic operation command, a custom atomic operation command, a read response, an acknowledge response, or a vendor-specific command. Additionally, the command may indicate a virtual channel of the data packet 400. For example, different commands may be used for different virtual channels or 1, 2, 3, or 4 bits of the seven-bit command field 430 may be used to indicate the virtual channel and the remaining bits may be used to indicate the command. The table below shows the virtual channel based on the protocol and the command is below, according to some example embodiments.

| Virtual Channel | CPI Protocol | AXI Protocol |
| --- | --- | --- |
| 0 | Read/Write Requests | Write Requests |
| 1 | Read/Write Responses | Write Responses |
| 2 | Unused | Read Requests |
| 3 | Unused | Read Responses |
| 4 | Priority Read/Write Requests | Priority Write Requests |
| 5 | Priority Read/Write Responses | Priority Write Responses |
| 6 | Unused | Priority Read Requests |
| 7 | Unused | Priority Read Responses |

An address for the command may be indicated in the path field 410. The memory access commands may identify a number of bytes to be written or accessed, a memory space to access (e.g., the off-die memory 275 or an instruction memory for custom atomic operations), or any suitable combination thereof. In some example embodiments, the command may indicate that additional bits of a later flit identify the command. For example, a multi-byte command could be sent by using a vendor-specific command in the seven-bit command field 430 and using a portion or all of the second flit 435 to store the multi-byte command. Thus, for certain values of the command field 430, the data packet 400 includes only one header flit (e.g., the first header flit shown in FIG. 4, containing fields 405-430). For other values of the command field 430, the data packet 400 includes a predetermined additional number of header flits or a predetermined total number of header flits.

If CR is enabled, two bits of the CR/RSV field 455, 465 identify whether the credit return is for virtual channel 0, 1, 2, or 3 and the other two bits of the CR/RSV field 455, 465 indicate whether the number of credits to be returned is 0, 1, 2, or 3.

Figure 5:
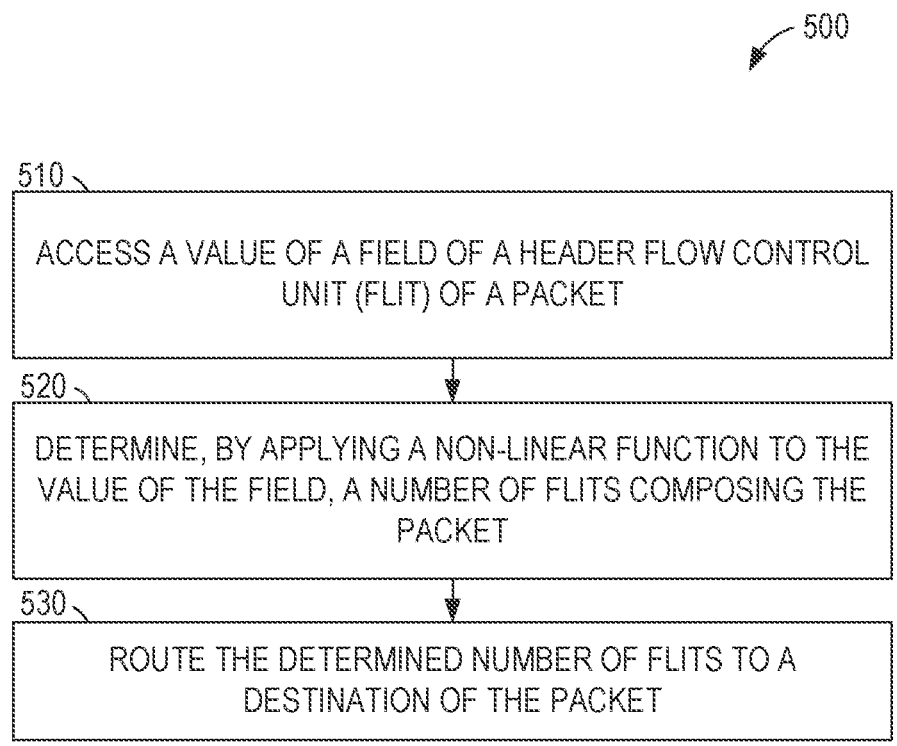
FIG. 5 is a flow chart showing operations of a method performed by a circuit in using a reduced size encoding of a packet length field, in accordance with some embodiments of the present disclosure.

FIG. 5 is a flow chart showing operations of a method performed by a circuit in using a reduced size encoding of a packet length field, in accordance with some embodiments of the present disclosure. The method 500 includes operations 510, 520, and 530. By way of example and not limitation, the method 500 is described as being performed by the devices of FIGS. 1-3, using the data packet of FIG. 4.

In operation 510, a routing device (e.g., the network node 330A of FIG. 3) accesses a value of a field of a header flit of a packet. For example, the chiplet 310A of FIG. 3, implementing the memory controller chiplet 205 of FIG. 2 may generate and transmit a packet to the chiplet 310D via the chiplet layout 300. Using the example data packet 400 of FIG. 4, only the first flit of the packet indicates the destination of all of the flits in the packet. Thus, each node along the path determines, based on the path field 410, the DID field 415, or both, which node to forward all of the flits of the packet to. The forwarding determination applies to a number of flits determined based on the length field 425. Thus, in this example, the value of the field of the header flit of the packet is the value of the length field 425.

The routing device, in operation 520, determines, by a applying a non-linear function to the value of the field, number of flits composing the packet. A linear function is a function of the form y=ax+b, wherein a and b are constants, x is the input value (in this case, the value of the field accessed in operation 510) and y is the output (in this case, the size of the packet measured in flits). Any function that cannot be expressed in this way is a non-linear function. Example non-linear functions include higher-order polynomial functions, step functions, exponential functions, trigonometric functions, and many others.

One example non-linear function is a step function in which two different linear functions are applied in two different ranges of the value of the field. For example, for a value of x below a predetermined threshold, the linear function y=x may be applied, in which the value of the field is simply the number of flits in the packet; for a value of x at or above the predetermined threshold, the linear function y=x+10 may be applied, in which the number of flits in the packet is 10 more than the value of the field. As other examples, the value of b may be changed between the two different ranges, more than two different ranges may be used, or any suitable combination thereof (including modifying the value of a) may be used.

In operation 530, the routing device routes the determined number of flits to a destination of the packet. Since the routing device and the transmitting device use the same method to determine the length of the packet, the routing device correctly determines the number of flits sent by the transmitting device for the packet and routes the determined number of flits to the destination. With reference to FIG. 3, the network node 330A may transmit the flits to the network node 330C, which also processes the first header flit according to the method 500 and transmits the flits to the network node 330D, which repeats the process again and transmits the flits to the destination chiplet 310D.

In packet formats with fixed-size headers, the offset value, b, may be the size of the header. Thus, the value of the size field is set to 0 when the packet consists only of the header and the size field indicates the number of additional flits in the packet. The range of the size field may be increased by increasing the size of the field itself. For example, a 2-bit size field can store values 0-3 but a 4-bit size field can store values 0-15. Another way to increase the range of the size field is by changing the factor, a. For example, if each increment of a first size field indicates a single flit, the maximum size that can be indicated is doubled by changing each increment to indicate two flits. However, each of these approaches has drawbacks. Increasing the number of bits of the size field increases the size of the header and, thus, the packets. As a result, network traffic and latency are increased. Increasing the granularity of the size field increases the probability that a particular packet will not have a size that exactly matches the available sizes. Accordingly, the next larger size will be selected and empty flits will be transmitted, also increasing network traffic and latency.

By use of the method 500 in a routing device, the range of sizes supported by a size field is increased without reducing granularity (at least in a first range) or increasing the size of the header of a packet. Thus, by comparison with systems having a smaller range of sizes, increased granularity, or more bits in the size field, throughput is enhanced and latency is reduced.

Figure 6:
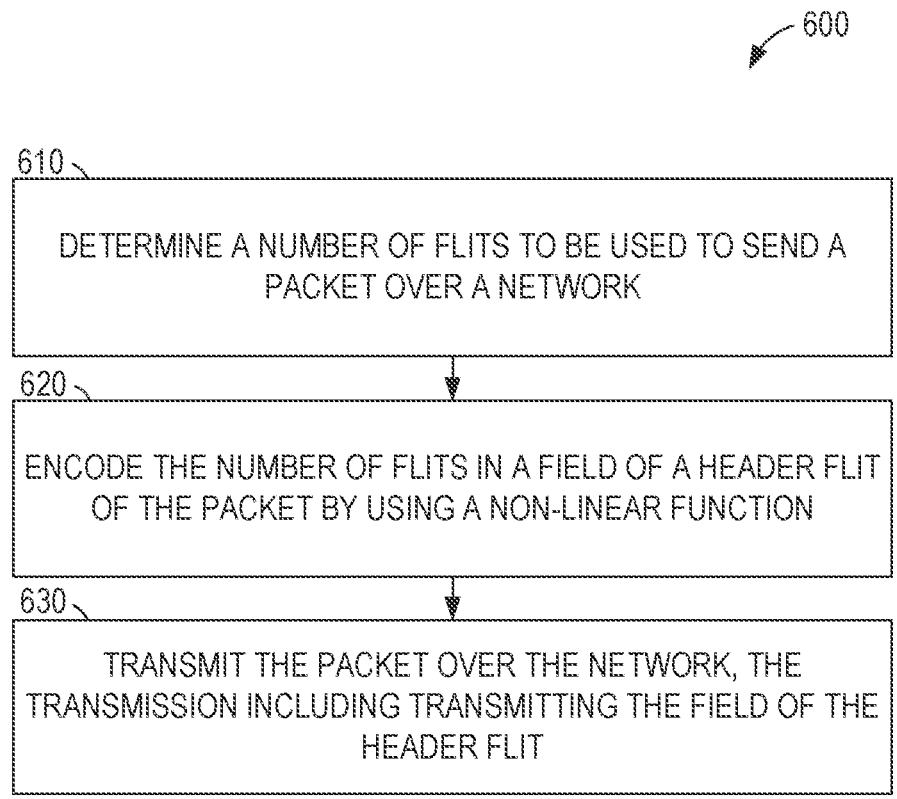
FIG. 6 is a flow chart showing operations of a method performed by a circuit in using a reduced size encoding of a packet length field, in accordance with some embodiments of the present disclosure.

FIG. 6 is a flow chart showing operations of a method 600 performed by a circuit in using a reduced size encoding of a packet length field, in accordance with some embodiments of the present disclosure. The method 600 includes operations 610, 620, and 630. By way of example and not limitation, the method 600 is described as being performed by the devices of FIGS. 1-3, using the data packet of FIG. 4.

In operation 610, a transmitting device (e.g., the chiplet 310D of FIG. 3, implementing or communicating with the memory controller chiplet 205 of FIG. 2) determines a number of flits to be used to send a packet over a network. For example, a size of the packet may be divided by a size of each flit to determine the number of flits in the packet.

The transmitting device, in operation 620, encodes the number of flits in a field of a header flit of the packet by using a non-linear function. The non-linear function may be a step function. In some example embodiments, if the number of flits is below a predetermined threshold, the value of the field is equal to the number of flits but if the number of flits is equal to or above the predetermined threshold, the value of the field is a predetermined amount less than the number of flits. As a specific example, if the number of flits is in the range 0-22, the value of the field is set to the number of flits; if the number of flits is in the range 33-37, the value of the field is set to ten less than the number of flits; if the number of flits is in the range 23-32, the value of the field is set to 23 (representing 33 flits) and empty flits are appended to the packet so that the number of flits sent matches the number indicated by the value of the field.

In some example embodiments, the threshold (e.g., 23) and offset (e.g., 10) are selected based on known criteria for packet construction. For example, if packets either contain exactly 32 or 128 bytes of data plus 0 to 64 bytes of additional information, sizes of 0-31 bytes and 97-127 bytes will never be encoded. Thus, a first range may be defined in which values of 32-96 bytes are encoded using a first linear function and values of 128-192 bytes are encoded using a second linear function, such that the step-wise function used to encode the value is not itself a linear function. Note that if each flit contains 4 bytes, the values discussed here are 8-24 flits in a first range and 32-48 flits in the second range.

In operation 630, the transmitting device sends the flits of the packet, including the field of the header flit. For example, the length field 425 of FIG. 4 may be sent in a header flit, along with the remaining flits of the packet.

By use of the method 600 in a transmitting device, the range of sizes supported by a size field is increased without reducing granularity (at least in a first range) or increasing the size of the header of a packet. Thus, by comparison with systems having a smaller range of sizes, increased granularity, or more bits in the size field, throughput is enhanced and latency is reduced.

Figure 7:
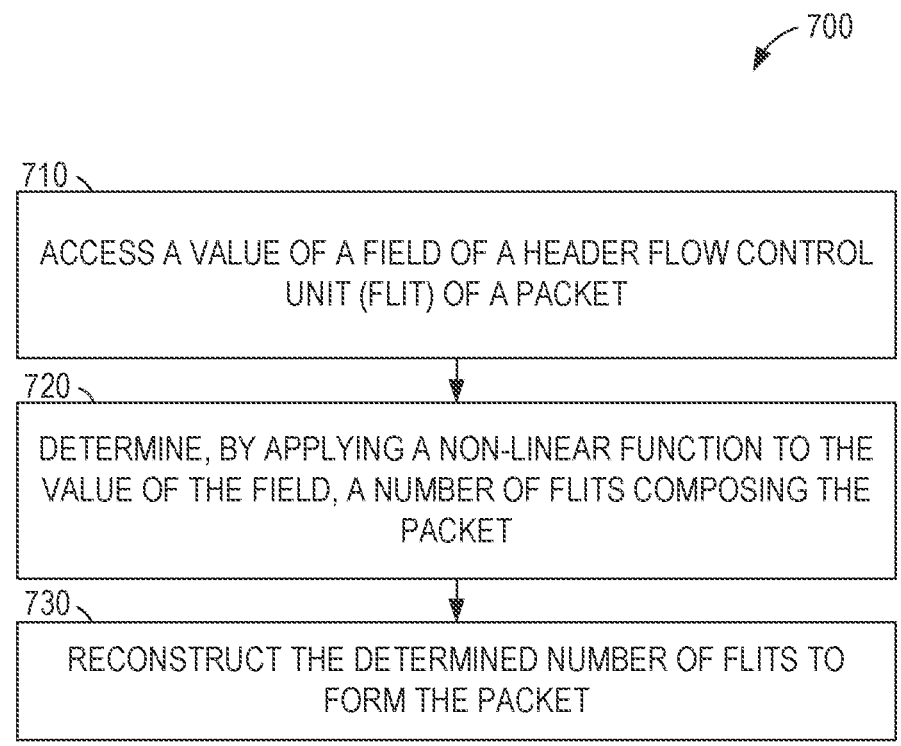
FIG. 7 is a flow chart showing operations of a method performed by a circuit in using a reduced size encoding of a packet length field, in accordance with some embodiments of the present disclosure.

FIG. 7 is a flow chart showing operations of a method performed by a circuit in using a reduced size encoding of a packet length field, in accordance with some embodiments of the present disclosure. The method 700 includes operations 710, 720, and 730. By way of example and not limitation, the method 700 is described as being performed by the devices of FIGS. 1-3, using the data packet of FIG. 4.

In operation 710, a receiving device (e.g., the chiplet 310D of FIG. 3) accesses a value of a field of a header flit of a packet. For example, the chiplet 310A of FIG. 3, implementing the memory controller chiplet 205 of FIG. 2 may generate and transmit a packet to the chiplet 310D via the chiplet layout 300. Using the example data packet 400 of FIG. 4, only the first flit of the packet indicates the destination of all of the flits in the packet. Thus, in this example, the value of the field of the header flit of the packet is the value of the length field 425.

The receiving device, in operation 720, determines, by a applying a non-linear function to the value of the field, a number of flits composing the packet. The determining of the number of flits of the packet may comprise, based on the value of the field and a predetermined threshold, adding a predetermined positive number of flits to the value of the field to determine the size of the packet. For example, if the value of the field is 23 or greater, the value of the field may be increased by 10 to determine the number of flits in the packet, wherein 23 and 10 are the predetermined threshold and the predetermined positive number, respectively. Alternatively, based on the value of the field and the predetermined threshold, the number of flits composing the packet may be determined by the receiving device to be the value of the field. For example, if the value of the field is less than the threshold of 23, the value of the field may be accepted without modification as the number of flits in the packet.

In operation 730, the receiving device reconstructs the determined number of flits to form the packet. For example, completion of the receiving of the packet may be determined based on a number of flits received from the source equaling the number of flits determined in operation 720. As another example, the number of flits determined in operation 720 may be read from a data buffer to form the packet. The formed packet may be processed by the receiving device (e.g., interpreted as a memory access command by the memory controller chiplet 205 and corresponding operations executed).

By use of the method 700 in a receiving device, the range of sizes supported by a size field is increased without reducing granularity (at least in a first range) or increasing the size of the header of a packet. Thus, by comparison with systems having a smaller range of sizes, increased granularity, or more bits in the size field, throughput is enhanced and latency is reduced.

Though the methods 500, 600, and 700 are described herein as operating on a field that identifies a size of a packet measured in flits, other measurements of packet size may be used such as bytes, words, double-words, transfer cycles (e.g., the number of flits divided by the number of flits transferred per cycle), or any suitable combination thereof.

Figure 8:
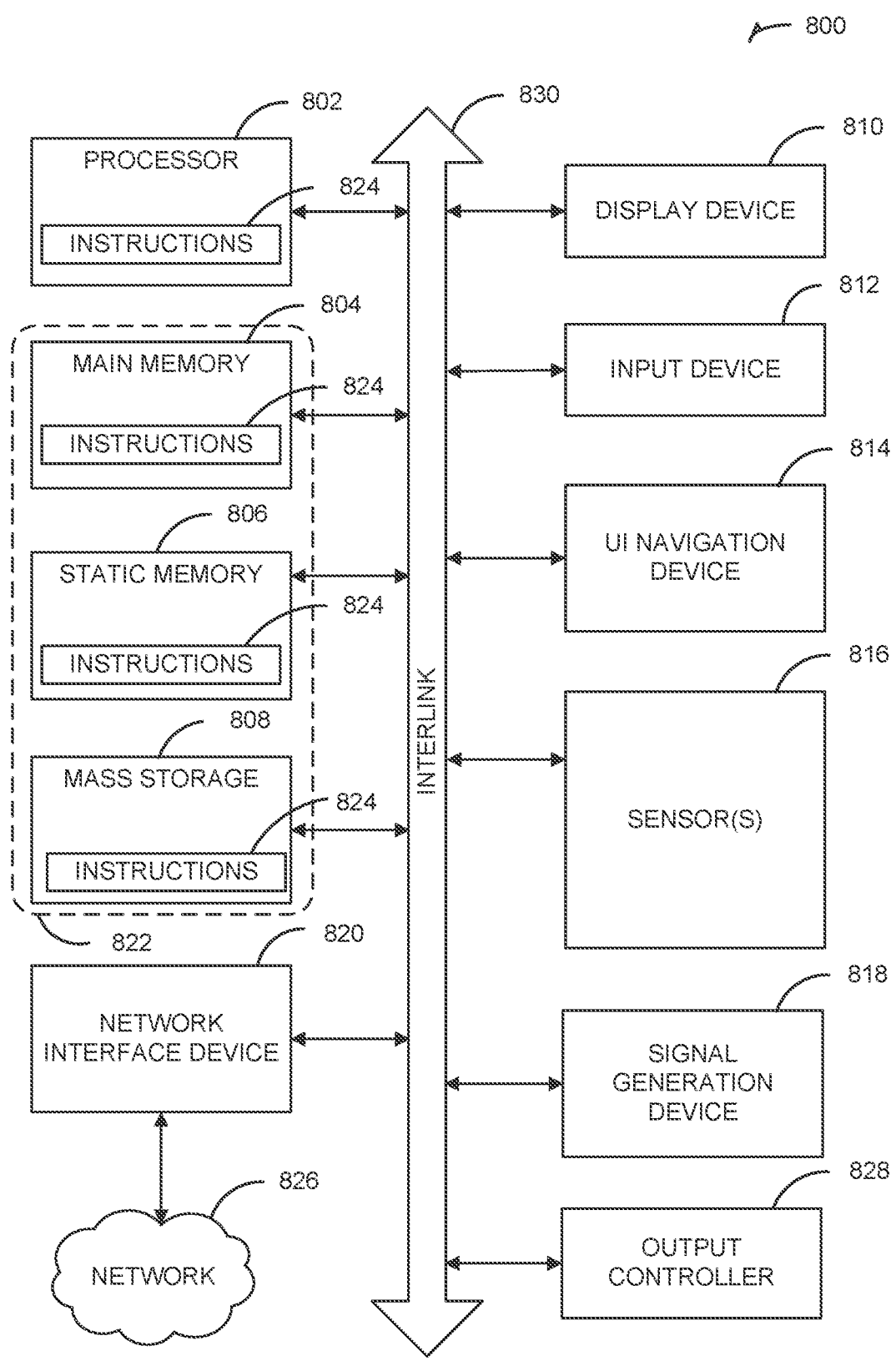
FIG. 8 is a block diagram of an example computer system in which embodiments of the present disclosure may operate.

FIG. 8 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory 806 (e.g., memory or storage for firmware, microcode, a basic-input-output (BIOS), unified extensible firmware interface (UEFI), etc.), and mass storage 808 (e.g., hard drives, tape drives, flash storage, or other block devices), some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812, and UI navigation device 814 can be a touch screen display. The machine 800 can additionally include a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine-readable medium 822. While the machine readable medium 822 is illustrated as a single medium, the term "machine readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and compact disc read only memory (CD-ROM) and digital versatile disc read only memory (DVD-ROM) disks.

In an example, information stored or otherwise provided on the machine readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a system comprising: a source chiplet comprising: a memory interface configured to communicate command/address or data signaling, or both, with a memory device; a network interface configured to communicate with a destination chiplet across a packet-based network, the network interface including a packet encoder; and processing circuitry that comprises logic to control the memory device and one or more processors, the processing circuitry further configured to control packet-based communications through the network interface, wherein the processing circuity is configured to perform operations comprising: determining a number of flow control units (flits) comprising a packet; determining, by applying a non-linear function to the number of flits, a value of a field of a header flit of the packet; storing the value of the field in the header flit of the packet; and transmitting the flits of the packet to the destination chiplet.

In Example 2, the subject matter of Example 1 includes, wherein the field is a 5-bit field, a minimum number of flits represented by the field is 0, and a maximum number of flits represented by the field is greater than 31.

In Example 3, the subject matter of Examples 1-2 includes, wherein the determining of the value of the field comprises: based on the number of the flits and a predetermined threshold, subtracting a predetermined positive number of flits from the number of flits to determine the value of the field.

In Example 4, the subject matter of Example 3 includes, wherein the predetermined threshold is 23.

In Example 5, the subject matter of Examples 3-4 includes, wherein the predetermined positive number of flits is 10 flits.

In Example 6, the subject matter of Examples 1-5 includes, wherein the determining of the value of the field comprises: based on the number of flits and a predetermined threshold, determining the value of the field to be the number of flits composing the packet.

In Example 7, the subject matter of Examples 1-6 includes, the destination chiplet, wherein the destination chiplet is configured to perform operations comprising: accessing the value of the field of the header flit of the packet; and determining, based on the value of the field and the non-linear function, the number of flits composing the packet.

Example 8 is a method comprising: determining, by processing circuitry of a source chiplet, a number of flow control units (flits) comprising a packet; determining, by applying a non-linear function to the number of flits, a value of a field of a header flit of the packet; storing the value of the field in the header flit of the packet; and transmitting, by the source chiplet, the flits of the packet to a destination chiplet.

In Example 9, the subject matter of Example 8 includes, wherein the field is a 5-bit field, a minimum number of flits represented by the field is 0, and a maximum number of flits represented by the field is greater than 31.

In Example 10, the subject matter of Examples 8-9 includes, wherein the determining of the value of the field comprises: based on the number of the flits and a predetermined threshold, subtracting a predetermined positive number of flits from the number of flits to determine the value of the field.

In Example 11, the subject matter of Example 10 includes, wherein the predetermined threshold is 23.

In Example 12, the subject matter of Examples 10-11 includes, wherein the predetermined positive number of flits is 10 flits.

In Example 13, the subject matter of Examples 8-12 includes, wherein the determining of the value of the field comprises: based on the number of flits and a predetermined threshold, determining the value of the field to be the number of flits composing the packet.

In Example 14, the subject matter of Examples 8-13 includes, accessing, by the destination chiplet, the value of the field of the header flit of the packet; and determining, by the destination chiplet, based on the value of the field and the non-linear function, the number of flits composing the packet.

Example 15 is a non-transitory machine-readable medium that stores instructions that, when executed by a processor of a system, cause the system to perform operations comprising: determining a number of flow control units (flits) comprising a packet; determining, by applying a non-linear function to the number of flits, a value of a field of a header flit of the packet; storing the value of the field in the header flit of the packet; and transmitting the flits of the packet to a destination chiplet.

In Example 16, the subject matter of Example 15 includes, wherein the field is a 5-bit field, a minimum number of flits represented by the field is 0, and a maximum number of flits represented by the field is greater than 31.

In Example 17, the subject matter of Example 16 includes, wherein the determining of the value of the field comprises: based on the number of the flits and a predetermined threshold, subtracting a predetermined positive number of flits from the number of flits to determine the value of the field.

In Example 18, the subject matter of Example 17 includes, wherein the predetermined threshold is 23.

In Example 19, the subject matter of Examples 17-18 includes, wherein the predetermined positive number of flits is 10 flits.

In Example 20, the subject matter of Examples 15-19 includes, wherein the determining of the value of the field comprises: based on the number of flits and a predetermined threshold, determining the value of the field to be the number of flits composing the packet.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A system comprising:
    a destination chiplet comprising:
        a memory interface configured to communicate command/address or data signaling, or both, with a memory device;
        a network interface configured to communicate with a source chiplet across a packet-based network, the network interface including a packet decoder; and
        processing circuitry that comprises logic to control the memory device and one or more processors, the processing circuitry further configured to control packet-based communications through the network interface, wherein the processing circuity is configured to perform operations comprising:
            receiving a header flit of a packet, the header flit comprising a field;
            determining, based on a non-linear function of a value of the field and a predetermined threshold, a number of flits comprising the packet; and
            receiving the flits of the packet from the source chiplet.

2. The system of claim 1, wherein the field is a 5-bit field, a minimum number of flits represented by the field is 0, and a maximum number of flits represented by the field is greater than 31.

3. The system of claim 1, wherein the determining of the number of flits comprises:
    based on the value of the field and the predetermined threshold, adding a predetermined positive number of flits to the value of the field to determine the number of flits.

4. The system of claim 3, wherein the predetermined threshold is 23.

5. The system of claim 3, wherein the predetermined positive number of flits is 10 flits.

6. The system of claim 1, wherein the packet includes a destination identifier that uniquely identifies the destination chiplet.

7. The system of claim 1, wherein the packet includes a 7-bit command field.

8. A method comprising:
    receiving, by processing circuitry of a destination chiplet, a header flit of a packet, the header flit comprising a field;
    determining, based on a non-linear function of a value of the field and a predetermined threshold, a number of flits comprising the packet; and
    receiving the flits of the packet from a source chiplet.

9. The method of claim 8, wherein the field is a 5-bit field, a minimum number of flits represented by the field is 0, and a maximum number of flits represented by the field is greater than 31.

10. The method of claim 8, wherein the determining of the number of flits comprises:

based on the value of the field and the predetermined threshold, adding a predetermined positive number of flits to the value of the field to determine the number of flits.

11. The method of claim 10, wherein the predetermined threshold is 23.

12. The method of claim 10, wherein the predetermined positive number of flits is 10 flits.

13. The method of claim 8, wherein the packet includes a destination identifier that uniquely identifies the destination chiplet.

14. The method of claim 8, wherein the packet includes a 7-bit command field.

15. A non-transitory machine-readable medium that stores instructions that, when executed by a processor of a system, cause the system to perform operations comprising:

receiving a header flit of a packet, the header flit comprising a field;

determining, based on a non-linear function of a value of the field and a predetermined threshold, a number of flits comprising the packet; and receiving the flits of the packet from a source chiplet.

16. The non-transitory machine-readable medium of claim 15, wherein the field is a 5-bit field, a minimum number of flits represented by the field is 0, and a maximum number of flits represented by the field is greater than 31.

17. The non-transitory machine-readable medium of claim 16, wherein the determining of the number of flits comprises:

based on the value of the field and the predetermined threshold, adding a predetermined positive number of flits to the value of the field to determine the number of flits.

18. The non-transitory machine-readable medium of claim 17, wherein the predetermined threshold is 23.

19. The non-transitory machine-readable medium of claim 17, wherein the predetermined positive number of flits is 10 flits.

20. The non-transitory machine-readable medium of claim 17, wherein the packet includes a destination identifier that uniquely identifies a destination chiplet.

* * * * *